United States Patent
Yamada (10) Patent No.: US 6,331,042 B1
(45) Date of Patent: Dec. 18, 2001

(54) SYSTEM FOR CALIBRATING IMAGE PROCESSING CHARACTERISTICS OF A PRINTER

(75) Inventor: Shigeki Yamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/577,977

(22) Filed: May 25, 2000

(30) Foreign Application Priority Data

May 28, 1999 (JP) .................................................. 11-149593
Jul. 14, 1999 (JP) .................................................. 11-200068

(51) Int. Cl.[7] .................................................. B41J 29/393
(52) U.S. Cl. .................................................. 347/19
(58) Field of Search .................................... 347/19, 40, 43; 358/502, 504, 518, 521, 529, 1.9

(56) References Cited

U.S. PATENT DOCUMENTS

| | | | | |
|---|---|---|---|---|
| 4,310,248 | * | 1/1982 | Meredith | 356/42 |
| 5,204,736 | | 4/1993 | Abe | 358/75 |
| 5,331,438 | * | 7/1994 | Harrington | 358/500 |
| 5,347,369 | * | 9/1994 | Harrington | 358/504 |
| 5,566,372 | | 10/1996 | Ikeda et al. | 355/208 |
| 5,797,690 | * | 11/1998 | Iwamura et al. | 347/19 |
| 5,917,511 | * | 6/1999 | Ueda | 347/19 |
| 5,956,469 | * | 9/1999 | Liu et al. | 358/1.9 |
| 5,995,714 | * | 11/1999 | Hadley et al. | 358/504 |
| 6,027,201 | * | 2/2000 | Edge | 347/19 |
| 6,035,103 | * | 3/2000 | Zuber | 358/518 |
| 6,055,073 | * | 4/2000 | Nomura et al. | 358/518 |
| 6,089,691 | * | 7/2000 | Kakutani | 347/43 |
| 6,109,722 | * | 8/2000 | Underwood et al. | 347/19 |

* cited by examiner

Primary Examiner—John Barlow
Assistant Examiner—Julian D. Huffman
(74) Attorney, Agent, or Firm—Fitzpatrick, Cella, Harper & Scinto (57) ABSTRACT

A calibration capability is implemented in a printer itself without using a scanner or an intensity level meter thereby achieving high color reproducibility. The calibration capability is realized by means including chart outputting means for outputting a chart used to determine an intensity level correction parameter of a printer, inputting means for inputting the parameter determined from the chart, table generation means for generating a table used to correct the intensity level of the printer in accordance with the input parameter, and intensity level correction means for correcting the intensity level of the printer using the table, thereby making it possible to visually correct the intensity level of the printer.

16 Claims, 7 Drawing Sheets

SYSTEM FOR CALIBRATING IMAGE PROCESSING CHARACTERISTICS OF A PRINTER

FIELD OF THE INVENTION

The present invention relates to setting of a correction parameter depending on a characteristic of an image forming unit.

DESCRIPTION OF THE RELATED ART

In conventional color printers such as an ink-jet printer for printing a natural color image, a variation in a printed color can occur when ink or a head for emitting ink is replaced, because of a lot-to-lot variation in the density of ink or the emission characteristic of the head. The variation in color can be a serious problem in particular when a color printer is used for design work or the like in which high reproducibility of color is required.

In one known technique for avoiding the above problem, a plurality of patches having different intensity levels are printed for each ink color using a printer, and the intensity levels of the printed patches are measured using an image scanner or an intensity level meter. Look-up tables are then produced for each color, and the intensities of output levels of the printer are adjusted to desired values using the look-up tables. This technique makes it possible to achieve high color reproducibility when ink or a head is replaced.

However, in the above conventional technique, it is required that an image scanner or an intensity level meter for measuring the intensity of printed patches be included in a system or a printer itself. This causes the following problems:

(1) The apparatus becomes complicated.
(2) The size of the apparatus becomes large.
(3) The cost of the apparatus increases.

SUMMARY OF THE INVENTION

In view of the above problems, it is an object of the present invention to provide a technique for implementing a calibration capability in a printer itself without using a scanner or an intensity level meter thereby achieving high color reproducibility.

It is another object of the present invention to provide a technique for calibrating an image forming unit which forms an image using a high-density recording agent and a low-density recording agent for a particular color, without causing an increase in the number of charts and without causing an increase in the labor time or effort of a user.

According to an aspect of the present invention, to achieve the above objects, there is provided an image processing method comprising the steps of: outputting, using an image forming unit, a chart including a plurality of patches used to determine a correction parameter; inputting a command issued by a user to specify a particular patch in the chart; and producing the correction parameter in accordance with the command issued by the user, the image processing method being characterized in that each of the plurality of patches includes an image reproduced using process black and an image reproduced using a black recording agent.

According to another aspect of the present invention, there is provided an image processing method for an image forming unit which forms an image using a high-density recording agent and a low-density recording agent for a particular color, the image processing method including the step of generating a correction parameter depending on a variation in a characteristic of the image forming unit, the image processing method being characterized in that a chart including a plurality of patches used to determine the correction parameter is output via the image forming unit using the high-density recording agent without using the low-density recording agent and then the correction parameter is generated in accordance with the chart.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Preferred embodiments of the present invention are described below with reference to the accompanying drawings.

First Embodiment

A first embodiment of the present invention is described first.

In this first embodiment, an ink-jet color printer is employed as the image forming unit by way of example. However, in the present invention, the image forming unit is not limited to the ink-jet color printer. Other types of color printers such as an electrophotographic color printer or a dye-sublimation color printer may also be employed as the image forming unit.

Figure 1:
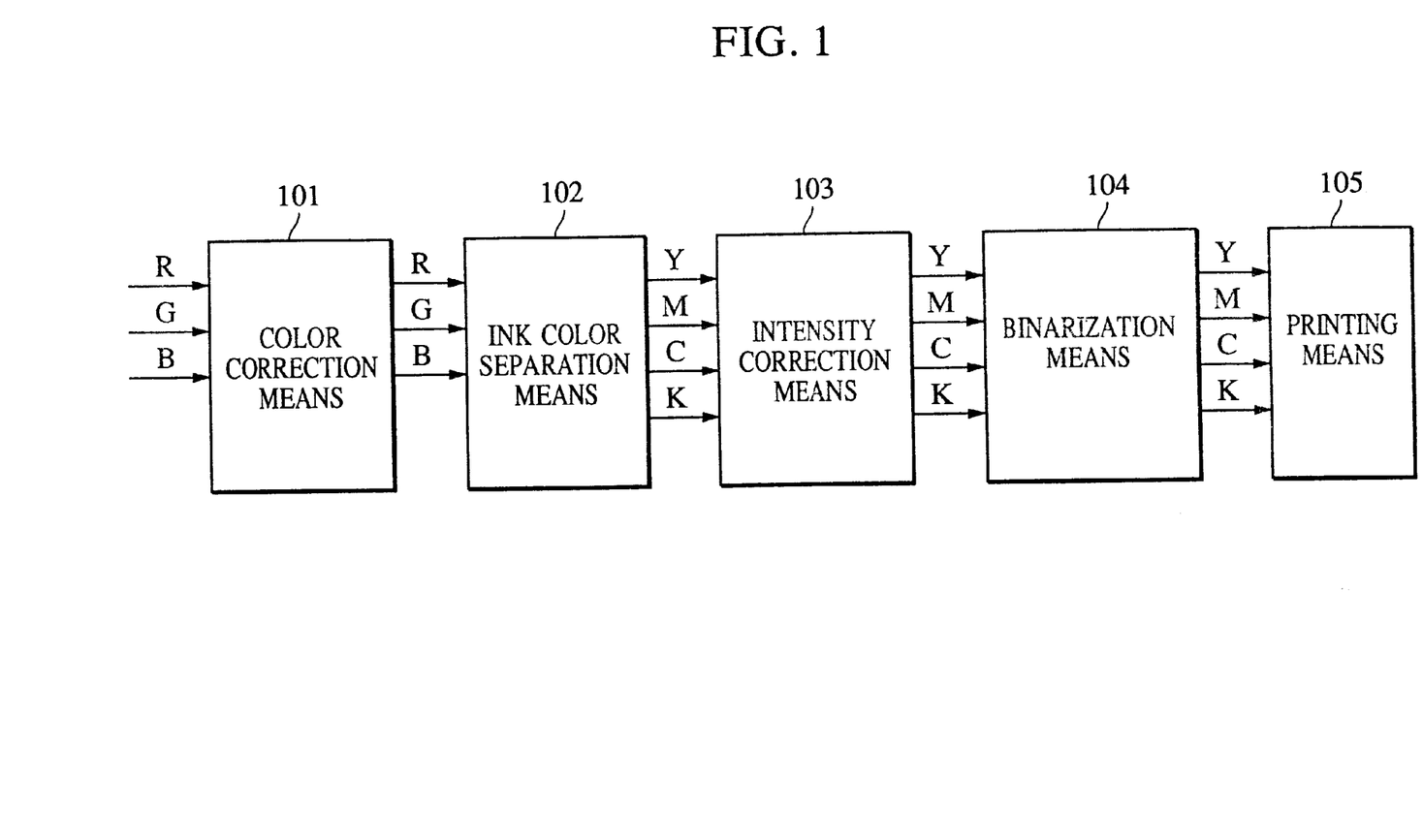
FIG. 1 is a block diagram illustrating the flow of image data according to a first embodiment of the present invention.

In the ink-jet color printer having a calibration capability, image data flows as shown in FIG. 1.

Image data including RGB components (red, green, and blue components) is applied to color correction means 101 and corrected so that the image data has desired RGB values. The resultant data is then sent to ink color separation means 102. The color separation means 102 converts the received RGB data into YMCK (yellow, magenta, cyan, and black) data corresponding to ink colors. The resultant data is then applied to intensity correction means 103.

The intensity correction means 103 corrects the output levels of the respective colors. If an ink head or an ink tank is replaced, the printed color will generally become different from that obtained before replacing the ink head or the ink tank, because of a variation in the output characteristic of the ink head or a variation in the ink density. The variation in the output characteristic of the ink head or ink density is compensated for by correcting the intensity under the correction conditions set by the calibration capability, thereby ensuring high color reproducibility.

After being corrected in terms of the intensity, the data is applied to binarization means 104. The binarization means 104 converts the received image data into two-level data by means of error diffusion or dithering. The resultant two-level data is applied to printing means 105 and printed on paper. The number of quantization levels may be determined depending on the characteristics of the printer in terms of the intensity level. Depending on the characteristics of the printer in terms of the intensity level, three or more quantization levels may also be employed.

Figure 2:
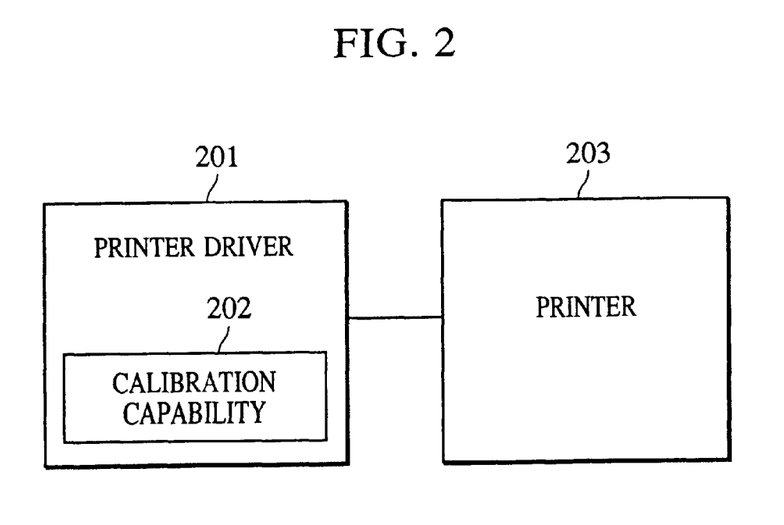
FIG. 2 is a block diagram illustrating relationships among a printer driver, a calibration capability, and a printer, according to the first embodiment.

FIG. 2 illustrates relationships among the printer driver 201, the calibration capability 202, and the printer 203. The printer driver has the capability achieved by the means from the color correction means 101 to the binarization means 104 shown in FIG. 1. In addition, the printer driver also has a calibration capability which will be described later.

Figure 3:
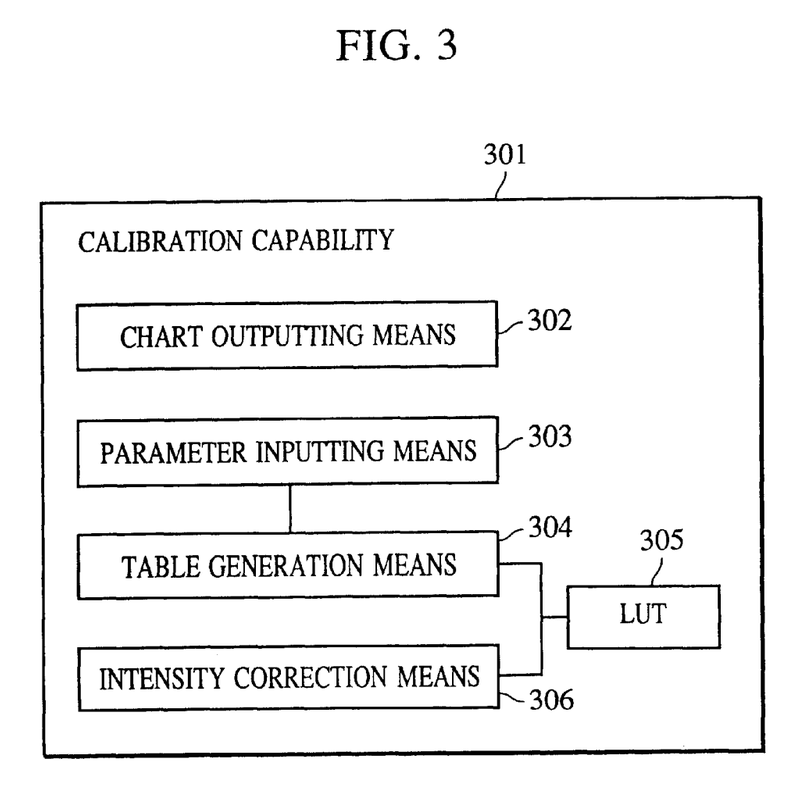
FIG. 3 is a block diagram illustrating the calibration capability in a more detailed fashion.

FIG. 3 illustrates the calibration capability in detail. The respective means associated with the calibration capability 301 operate as follows. In FIG. 3, reference numeral 302 denotes chart outputting means. If an operator selects a calibration button on a printer driver operation screen, the chart outputting means 302 outputs calibration chart data recorded on a hard disk or the like to a printer unit 203. In accordance with the calibration chart data, the printer unit 203 prints a chart.

Figure 4:
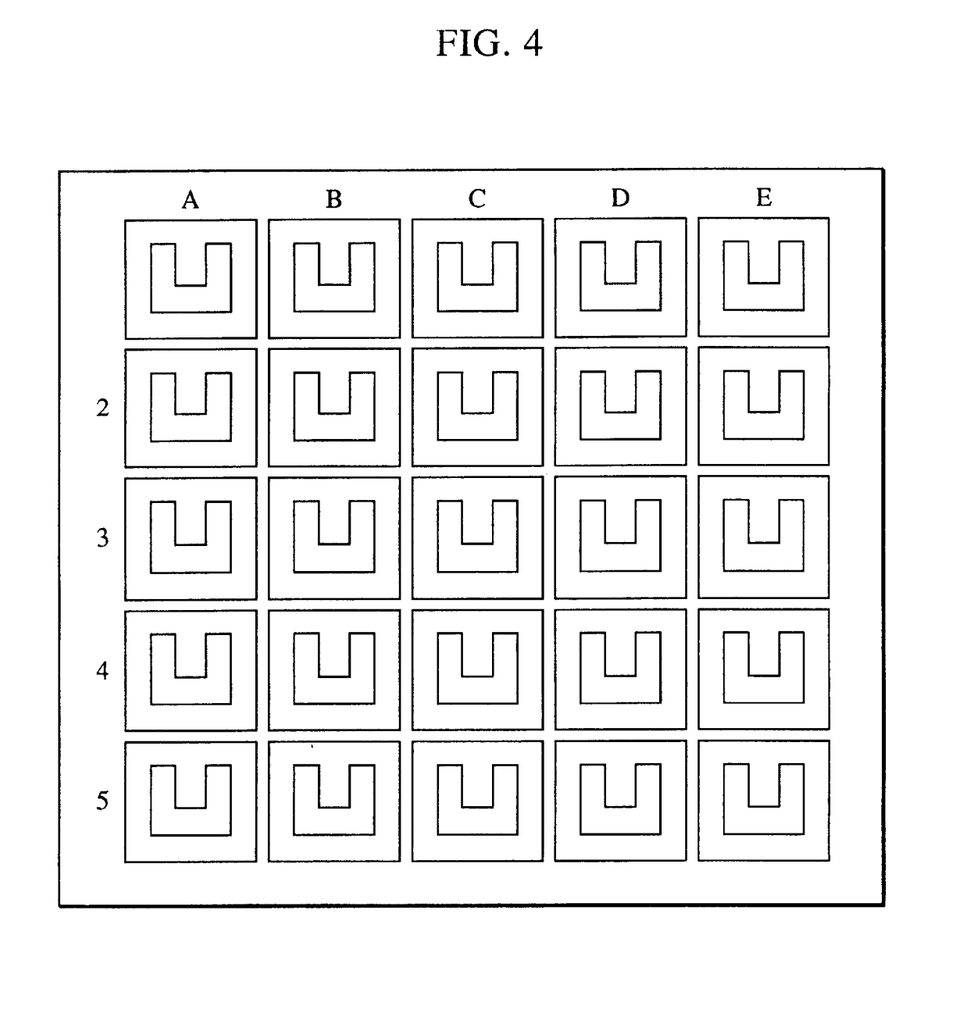
FIG. 4 illustrates an example of a printed chart.

FIG. 4 illustrates an example of a printed chart. The chart includes 25 patches arranged in the form of a 5×5 array. Each patch includes a color pattern having a shape similar to a horizontally tilted character of C embedded in a square-shaped background pattern, wherein the intensity of horizontally tilted C pattern is varied patch by patch.

Each square-shaped background pattern (in which one horizontally tilted C pattern is embedded) is formed so as to E have a predetermined level of gray using only a black ink. On the other hand, the horizontally tilted C patterns are formed so as to be gray using yellow, magenta, and cyan inks. The gray or black color represented by mixing a plurality of color inks is called process black. Herein, the intensity level of yellow is fixed at a particular value for all 25 horizontally tilted C patterns. However, the intensity of cyan is increased in the order of alphabetical characters printed on the chart. That is, the intensity of cyan increases in the order A<B<C<D<E. On the other hand, the intensity level of magenta is increased in the order of numeric characters printed on the chart. That is, the intensity of magenta increases in the order 1<2<3 <4<5.

This chart is designed such that when a standard ink head and standard inks are used, the patch at the location C-3 has a minimum color difference between the gray of the background pattern formed using only the black ink and the process black of the horizontally tilted C pattern formed using the yellow, magenta, and cyan inks. A user selects a patch which has a minimum color difference (maximum color similarity) between the background and the horizontally tilted C pattern from the patches of the chart and inputs the patch number of the selected patch using the parameter inputting means 303.

The chart, in which the gray formed using the process black is combined with the gray formed using only the black ink as shown in FIG. 4, allows the user to easily distinguish the color difference.

The parameter inputting means 303 displays a dialog box on a monitor screen so that the user can input the patch number using a keyboard or a mouse. In the present embodiment, the user inputs a combination of an alphabetic character and a numeric character printed on the chart.

The parameter input via the parameter inputting means 303 is applied to table generation means 304. In accordance with the given parameter, the table generation means 304 generates a look-up table (LUT). The resultant look-up table based on the given parameter is combined with a look-up table which has been produced in advance on the basis of the characteristics obtained when the standard ink head and the standard inks are used and which is stored in the intensity correction means. The combined look-up table represents the correction conditions to be employed by the intensity correction means 103.

By compensating for the variation in the characteristic with respect to the standard characteristic using the chart, it is possible to generate a look-up table (correction parameter table) which allows high-accuracy correction for the non-linear characteristic of a printer and also for variations of the ink head and inks.

The algorithm of producing the look-up table is described below. Herein, the data values of yellow (Y), magenta (M), cyan (C) and black (K) for the patch at the center position (C, 3) in FIG. 4 are represented by y1, m1, c1, and k1, and the data values of Y, M, C, and K for a patch selected by a user are represented by y2, m2, c2, and k2. Because the intensity levels of yellow and black are fixed, y1=y2 and k1=k2. If the gradients of the look-up table to be determined are represented by $Y_i$, $M_i$, $C_i$, and $K_i$, then they are given as follows:

$$Y_i = y2/y1 = y1/y1 = 1.0$$

$$M_i = m2/m1$$

$$C_i = c2/c1$$

$$K_i = k2/k1 = k1/k1 = 1.0 \tag{1}$$

Using the obtained gradients, a look-up table is produced in accordance with four parameters in terms of Y, M, C, and K.

In the printing operation, the intensity levels of Y, M, C, and K are corrected using the LUT 305. The corrected data is then applied to the binarization means 104 and converted to two-level data. In according with the resultant two-level data, the printing means 105 performs printing.

According to the present embodiment, as described above, it becomes possible to achieve high color reproducibility by performing the printer calibration after replacing a head or an ink.

In the present embodiment, because the calibration is performed using gray or achromatic patches as shown in FIG. 4, it is possible to produce the look-up table which allows the gray balance to be well adjusted.

In the output chart according to the present embodiment, a plurality of patches are arranged such that the intensity level of Y is fixed and those of M and C are varied. Alternatively, the intensity level of M may be fixed, and the intensity levels of Y and C may be varied.

The present embodiment also allows the printer to be easily calibrated with high accuracy without using an image scanner or an intensity level meter. Because neither the image scanner nor the intensity level meter is used, the problems of high complexity, large size, and high cost of the apparatus can be avoided.

Although in the output chart according to the present embodiment, a plurality of patches are arranged such that the intensity level of Y is fixed and those of M and C are varied, the intensity level of C may be fixed, and the intensity levels of Y and M may be varied.

Furthermore, although in the present embodiment, each patch is formed by embedding a process black pattern in a black ink pattern, each pattern may also be formed by embedding a black ink pattern in a process black pattern.

Still furthermore, although in the present embodiment, each patch is formed by placing a pattern including an outward extending part and an inward recessed part in a rectangular-shaped pattern, the shape of the pattern placed in each rectangular-shaped pattern is not limited to that having an outward extending part and an inward recessed part. Instead, a circular-shaped pattern may be placed in a rectangular-shaped pattern. Furthermore, the shape of the background pattern is not limited to the rectangle, but any arbitrary shape may be employed. Each patch may also be formed such that a black ink pattern and a process black pattern are placed in a side-by-side fashion or in a one-above-another fashion.

Figure 8:
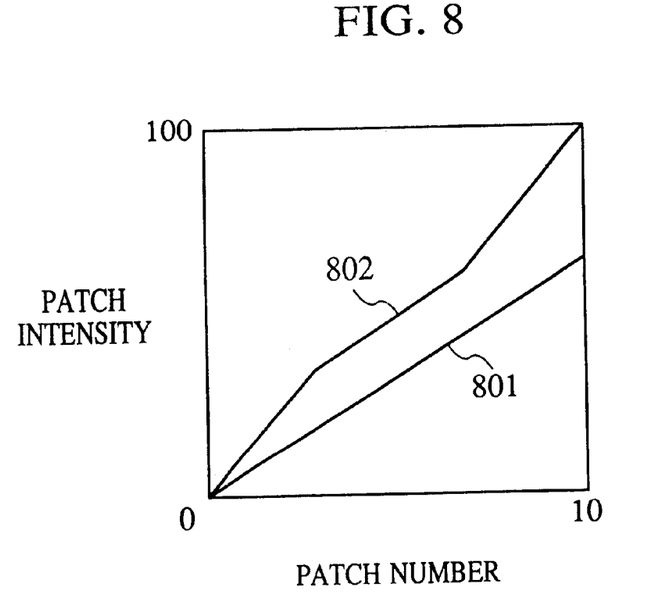
FIG. 8 illustrates the patch intensity as a function of the patch number.

In the chart shown in FIG. 4, the cyan intensity increases in the order A<B<C<D<E, and the magenta intensity increases in the order of numeric characters printed on the chart such that 1<2<3<4<5. If the intensities are linearly varied, the resultant variations in intensities are visually perceived as varying uniformly. For this reason, the patches are generally arranged such that the intensities vary linearly. When the characteristic of the ink head has a small variation, it is desirable that the intensities vary linearly. However, in the case where the characteristic of the ink head has a large variation, if the intensities are linearly varied, the intensity difference between adjacent patches becomes large, and thus the setting sensitivity becomes low. In this case, the intensities may be varied non-linearly with the patch location so that the chart can be used to compensate for a large variation in the characteristic of the head while maintaining a high sensitivity. FIG. 8 illustrates the patch intensity as a function of the patch number. In this figure, a line 801 represents an example of the patch intensity which varies in proportion to the patch number. That is, the patches are arranged such that the intensity increases linearly. If this arrangement is applied to the chart shown in FIG. 4, the intensity increases uniformly in the order A<B<C<D<E and also in the order 1<2<3<4<5. On the other hand, a line 802 has greater gradients in both end areas of the chart than the line 801, although the gradient is equal to that of the line 801 in the center area of the chart. In other words, the chart based on the line 802 has a small intensity difference from a path to another in the center area, but the chart has a large intensity difference in both end areas. This means that the center area of the chart has a high sensitivity, and the both end areas have a low sensitivity. Thus, the arrangement based on the line 802 makes it possible to cover a greater intensity range using the same number of patches as that based on the line 801. In most cases, the variation in the characteristic of the head falls within the center area. Therefore, for most heads, a patch is selected from those in the center area in which the intensity varies within the low gradient range of the line 802, that is, within the high-sensitivity range. Even in a rare case where a replaced head has a greatly deviated characteristic, it is possible to select a proper patch because the chart based on the line 802 covers the wide range, as opposed to the chart based on the line 801 which has a small intensity range and thus which cannot cover large deviations.

Second Embodiment

In the first embodiment described above, the invention is applied to a printer using four color inks including Y, M, C, and K inks. In this second embodiment, the calibration capability described above with reference to the first embodiment is applied to a printer using six color inks including a yellow (Y) ink, a high-density magenta (M+) ink, a low-density magenta (M−) ink, a high-density cyan (C+) ink, a low-density cyan (C−) ink, and a black (K) ink. That is, high- and low-density inks are used for magenta and cyan.

Figure 5:
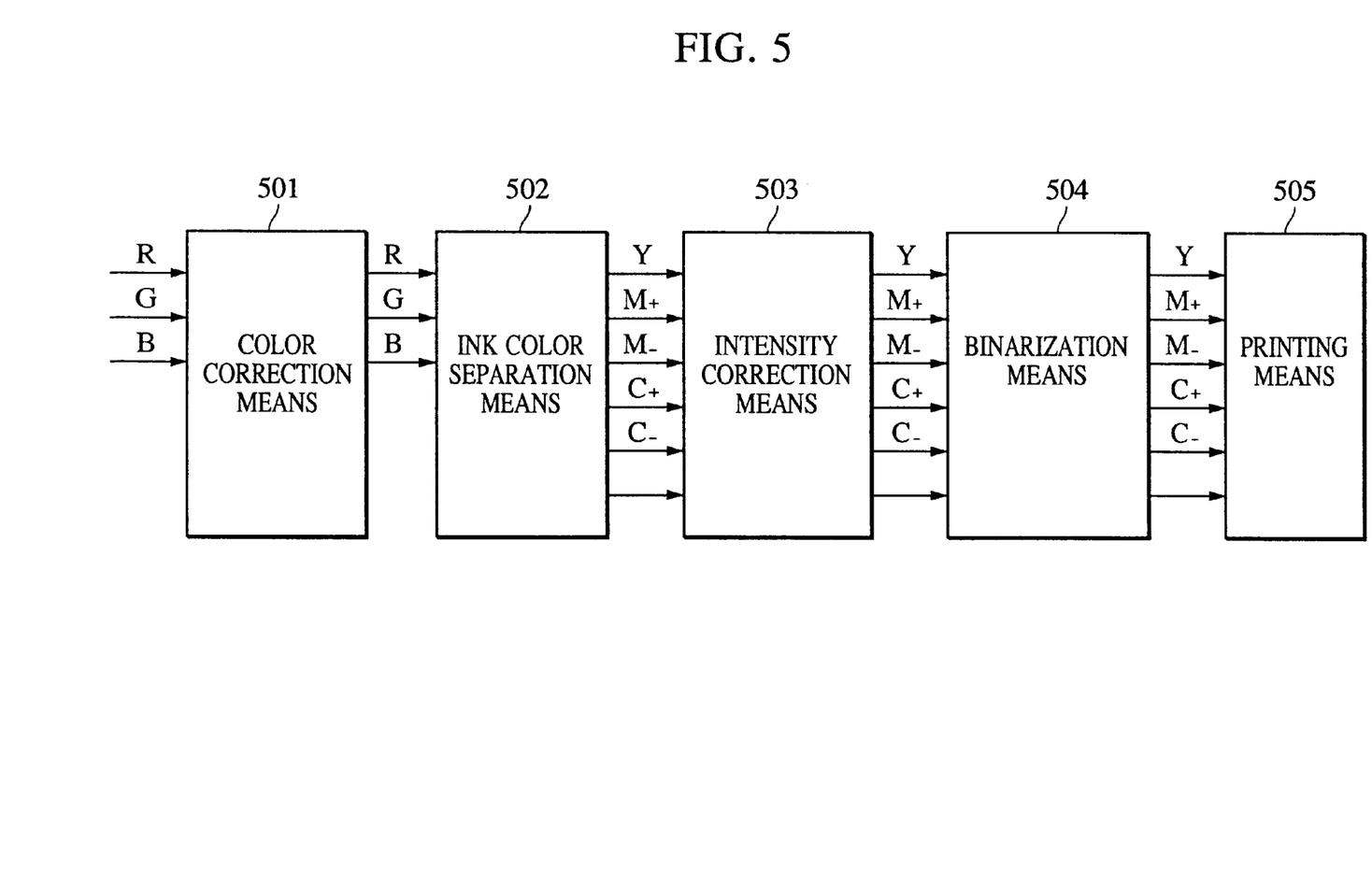
FIG. 5 is a block diagram illustrating the flow of image data according to a second embodiment of the present invention.

FIG. 5 illustrates the flow of image data. The difference from that shown in FIG. 1 is in that ink color separation means 502 separates RGB data into a greater number of color components corresponding to the increased number of color inks.

In the present embodiment, two different calibration charts each similar to that shown in FIG. 4 are produced, and calibration is performed using these two charts. A first chart is concerned with Y, M+, C+, and K, as in the first embodiment. A second chart is concerned with Y, M−, C−, and K. In both charts, Y and K are fixed at intensity levels properly selected in the respective charts. More specifically, in the first chart, the intensity level of Y is fixed at a value which creates gray when mixed with M+ and C+, and K is fixed at an intensity level equal to the gray level created by the process black using Y, M+, and C+. There are many possible manners in which Y, M+, and C+ are mixed to create process black. However, combinations of Y, M+, and C+ should be selected so that gray is obtained at the center position of the chart, that is, at (C, 3) in the specific example shown in FIG. 4, under the ideal conditions in terms of the head and inks. On the other hand, in the second chart, the intensity level of Y is fixed at a value which creates gray when mixed with M− and C−, and K is fixed at an intensity level equal to the gray level created by the process black using Y, M−, and C−.

A user selects a patch from the first chart to obtain the best balance between M+ and C+ and selects a patch from the second chart to obtain the best balance between M− and C−. The user then inputs the patch numbers of selected patches via the parameter inputting means 303 shown in FIG. 3. The subsequent process is performed in a similar manner as in the first embodiment except that six LUTs are created for Y, M+, C+, M−, C−, and K, respectively.

Third Embodiment

In the second embodiment described above, the calibration of the printer using six color inks is performed in accordance with the six LUTs created using the first chart associated with Y, M+, C+, and K similar to the first chart according to the first embodiment and also using the second chart associated with Y, M−, C−, and K.

However, the outputting two charts is performed at the expense of increased labor time and effort of a user. In this third embodiment, in order to avoid the above problem, only the first chart is used to calibrate a printer with six color inks.

When high- and low-density inks are used, the density variation of the high-density ink has a greater influence upon the color reproducibility of the output image than that of the low-density ink. In the present embodiment, in view of the above, only the variations in the high-density inks are compensated for in the calibration process.

Furthermore, in the present embodiment, the calibration can be performed in one-half the time required to perform the calibration using two charts associated with low-density and high-density inks, respectively.

In the present embodiment, only one chart associated with Y, M+, C+ and K is output, and the chart associated with Y, M−, C−, and K is not output.

In the chart, the levels for Y and K are fixed at proper values. More specifically, the intensity level of Y is fixed at a value which creates gray when mixed with M+ and C+, and K is fixed at an intensity level equal to the gray level created by the process black using Y, M+, and C+. There are many possible manners in which Y, M+, and C+ are mixed to create process black. However, combinations of Y, M+, and C+ should be selected so that gray is obtained at the center position of the chart, that is, at (C, 3) in the specific example shown in FIG. 4, under the ideal conditions in terms of the head and inks.

A user selects a patch from the first chart which results in the best balance between M+ and C+. The user then inputs the patch number of the selected patch via the parameter inputting means 303 shown in FIG. 3. Subsequently, as in the previous embodiments, color correction LUTs are created.

When a high-density ink and a low-density ink are used for a particular color as is the case with the present embodiment, a simple way to perform calibration is to output two intensity calibration charts one of which is associated with Y, M+, C+ and K and the other one is associated with Y, M−, C−, and K and generate six LUTs in accordance with parameters determined using these two charts. However, this technique has the drawbacks described above. Thus, in the present embodiment, the calibration is performed with high accuracy in an easy manner using only one chart associated with high-density inks without using the chart associated with low-density inks. In this technique, the high accuracy can be achieved as described below without needing a chart associated with low-density inks.

Figure 10A:
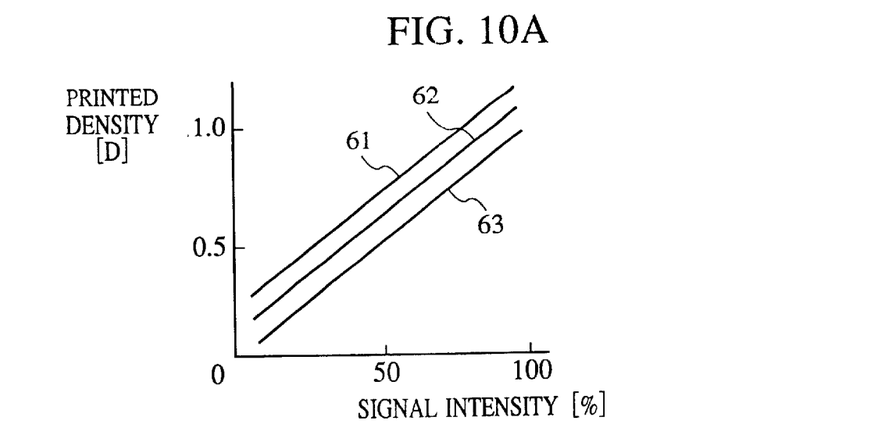
FIG. 10 illustrates the relationship between the signal intensity and the printed density for low-density ink and high-density ink.
Figure 10B:
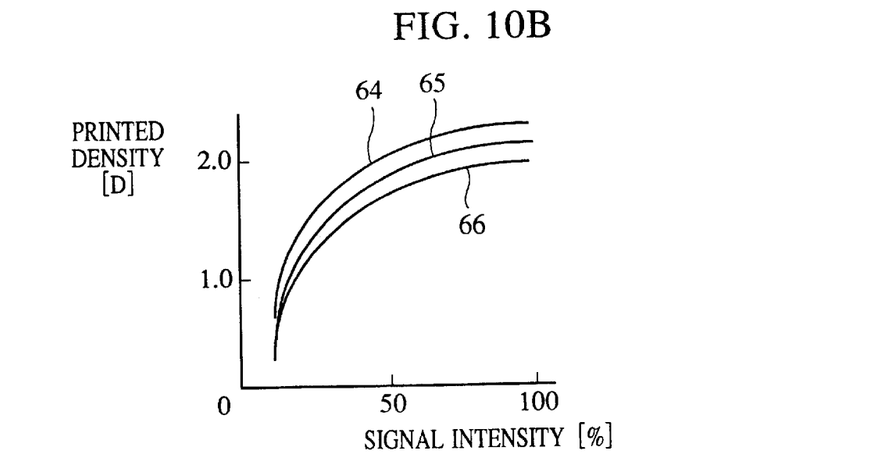
Figure 10C:
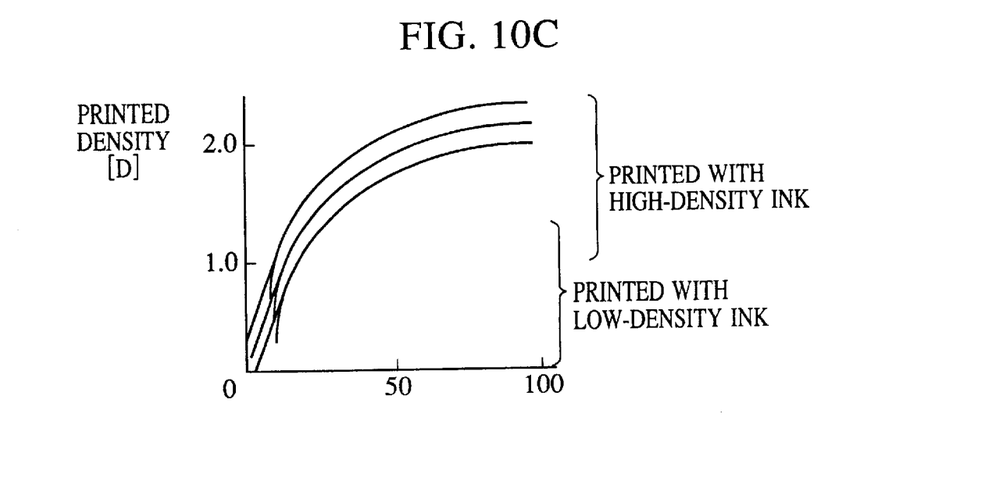

FIG. 10A illustrates the relationship between the signal intensity and the printed density for a low-density magenta ink, wherein the horizontal axis represents the signal intensity and the horizontal axis represents the average measured value of the printed density. Similarly, FIG. 10B illustrates the relationship between the signal intensity and the printed density for a high-density magenta ink, In FIGS. 10A and 10B lines 61 and 64 represent the measured result for a head which produced a maximum printed density. On the other hand, lines 62 and 65 represent the measured result for a head which produced a middle printed density, and lines 63 and 66 for a minimum printed density. In general, the variation in the printed density is caused by the difference in the amount of ink emitted from the head. As can be seen from FIG. 10A, the ratio of the variation in the printed density among heads is constant over a wide range of the intensity level. More specifically, the maximum variation is ±5% around the average value. That is, the maximum printed density of the low-density magenta ink is about 1.0, and a variation can occur around 1.0 within the range from 0.95 to 1.05. This means that a variation of at most 0.1 can occur. On the other hand, the maximum printed density of the high-density magenta ink is about 2.0, and a variation in the printed density can occur around 2.0 within the range of 1.90 to 2.10. This means that a variation of at most 0.2 can occur. In the above discussion, the effect of a single ink is involved. However, in a practical operation of printing an image, as shown in FIG. 10C, low-intensity levels are represented using only low-density inks, high-intensity levels are represented using only high-density inks, and middle-intensity levels are represented by properly mixing low- and high-density inks. Therefore, in the practical operation, the high-density range of the low-density ink shown in FIG. 10A is not used. For the same reason, the low-density range of the high-density ink shown in FIG. 10B is not used in the practical operation. More specifically, low-density inks are used in the range below the density of 0.6, and the variation in the density around 0.6 is within the range of 0.57 to 0.63. That is, the maximum variation is as small as 0.06, which can be neglected visually. Therefore, in the case where the variation in the characteristic of the head is not very great, density variations of low-density inks can be neglected, and thus the correction of intensity levels for low-density inks can be skipped without causing a significant problem.

Fourth Embodiment

Figure 6:
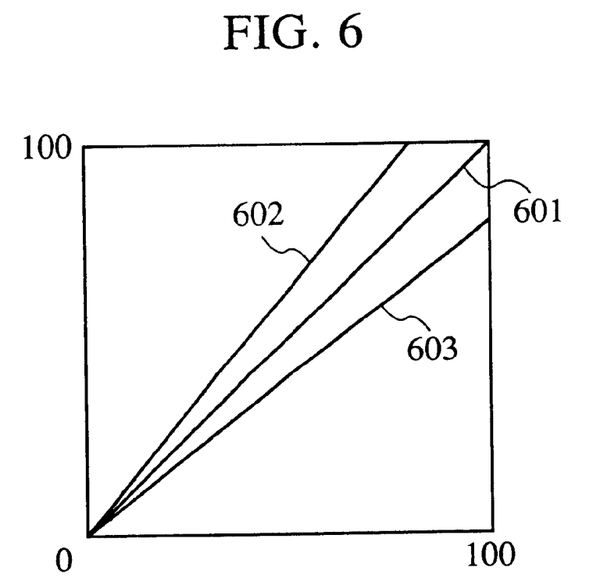
FIG. 6 illustrates an example of a look-up table.

Instead of generating the LUT in the manner described above, the LUT may also be generated as follows. FIG. 6 illustrates an example of a look-up table (LUT) used for the intensity correction. The gradient of the LUT can be determined in accordance with equation (1) for each ink. In most cases, the table determined in accordance with equation (1) can be directly used. However, in some cases, it is required to modify the table. In FIG. 6, a line 601 corresponds to a table with a gradient of 1, and a line 602 corresponds to a table with a gradient greater than 1. When the gradient is greater than 1, the output level is fixed at 100 for input values in the range higher than a particular value. If such an LUT is used to form an image with gradation such as computer graphics, the output intensity level is saturated at a particular value although the input signal level increases beyond a value corresponding to the saturated output level. As a result, a false contour is formed. Therefore, when gradation is represented, it is desirable that the gradient be smaller than 1 as with the line 601 or 603. When the given gradient is greater than 1, the gradient may be corrected as follows. For example, when the gradients for respective color inks are given in accordance with equation (1) as follows, $$Y_i=1.0,\ M_i=1.2,\ C_i=1.1,\ \text{and}\ K_i=1.0,$$

all values are normalized by dividing them by the maximum value. In this specific example, the maximum value is 1.2, and thus all values are divided by 1.2 as follows:

$$Y_i=0.83,\ M_i=10.0,\ C_i=0.92,\ \text{and}\ K_i=0.83.$$

Thus, all the gradients have been modified to be less than 1.0 while maintaining the ratios among Y, M, C, and K. Although the modification of the gradients results in a general reduction in the output intensity level, the color correction can be performed without causing a change in color balance. Besides, beautiful gradation can be reproduced. When the maximum intensity level does not exceed 1.0, it is not required to perform the normalization described above.

Fifth Embodiment

In the fourth embodiment described above, one type of ink is used for each of C and M. However, in a fifth embodiment, two types of inks with high and low densities are used for each of C and M. For example, when cyan gradation data is printed, low intensity levels are reproduced using the low-density cyan ink, and low intensity levels are reproduced using the high-density cyan ink. That is, gradation is reproduced using two types of inks. Herein, if the gradient of the LUT associated with the low-density cyan ink is greater than 1.0, a false contour will appear in gradation formed using the low-density cyan ink. Because the false contour will appear at a middle level of gradation, that is, at a boundary between the low-density cyan ink and the high-density cyan ink, the false contour will be very conspicuous. Not only when gradation is represented but also when other images are represented, a false contour with a middle intensity level results in degradation in the visual quality of the image. To avoid the above problem, it is required that gradients of LUTs associated with low-density inks should be equal to or less than 1.0. If the given gradient for a low-density ink is greater than 1.0, normalization is performed using the maximum gradient of that low-density ink. For example, when gradients for respective inks are given in accordance with equation (1) as follows, $$Y_i=1.0, M_{i+}=1.3, M_i=1.2, C_{i+}=1.1, C_i=1.1, \text{ and } K_i=1.0,$$

where suffix + is used to represent high-density ink and suffix − is used to represent low-density ink, normalization is performed by dividing the values by the maximum value of the gradients of the low-density inks, that is, by 1.2. As a result, normalized gradients are given as follows:

$$Y_i=0.83, M_i+=1.1, M_i=1.0, C_{i+}=0.92, C_i=0.92, \text{ and } K_i=0.83.$$

In the present embodiment, the gradient is allowed to be greater than 1.0 for high-density inks. However, if desired, the gradient may be limited to the range below 1.0 also for the high-density inks.

Sixth Embodiment

Figure 7:
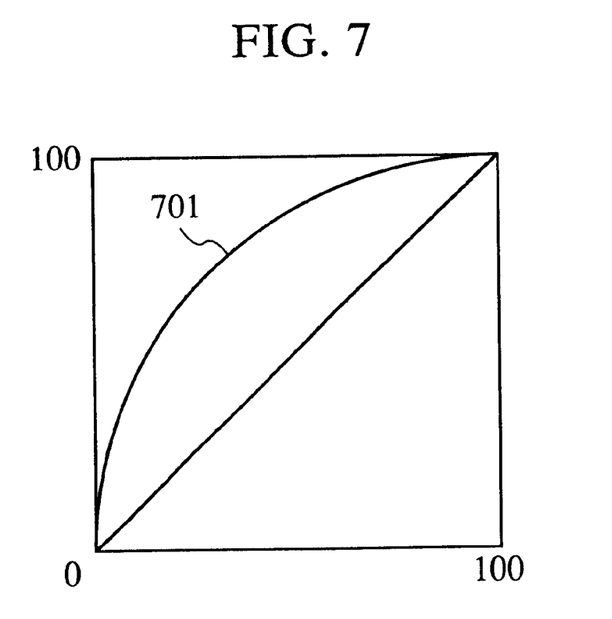
FIG. 7 illustrates an example of a look-up table.

In the first embodiment described above, the LUT is produced in a linear fashion in the calibration process. Instead, in this sixth embodiment, the LUT is produced in a non-linear fashion. If a table has non-linearity such as that represented by a line 701 in FIG. 7, the output intensity level is increased in the middle range, and the false contour effect in the high intensity level is reduced.

Seventh Embodiment

Figure 9:
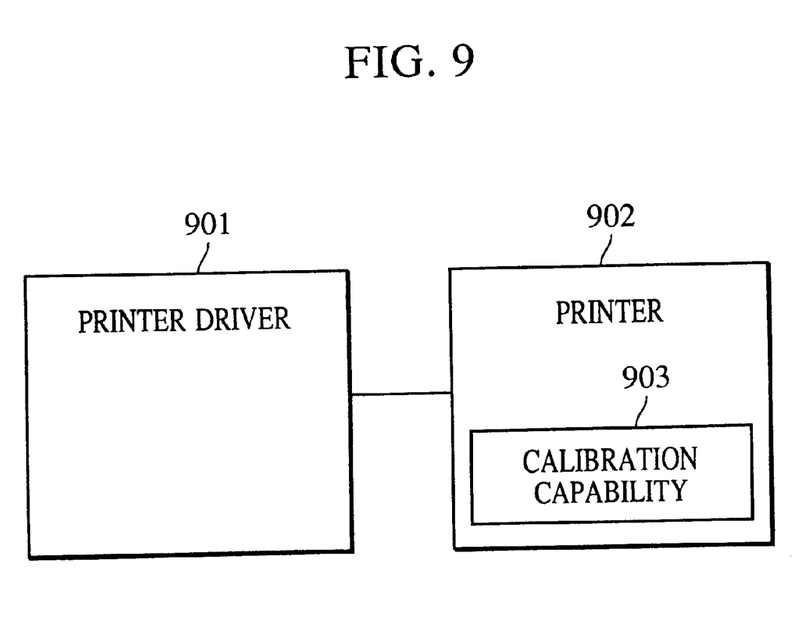
FIG. 9 is a block diagram illustrating relationships among a printer driver, a calibration capability, and a printer.

In the first embodiment described above, the calibration capability is implemented as one of capabilities of a printer driver as shown in FIG. 2. Instead, in this seventh embodiment, the calibration capability is implemented as one of capabilities of a printer, as shown in FIG. 9.

Modifications

The functions of the present invention described above with reference to specific embodiments may also be achieved by supplying a software program code to a computer connected to various devices thereby operating the various devices under the control of the computer (CPU or MPU) or the system in accordance with the program code so that the above functions (for example, the functions achieved by the flow shown in FIG. 3) are achieved. It should be understood that such a computer or a computer system falls within the scope of the present invention.

In this case, the program code of the above software implements the functions of the embodiments, and thus the program code and also means such as a storage medium for supplying such a program code to a computer fall within the scope of present invention.

Specific examples of such a storage medium for storing the program code include a floppy disk, a hard disk, an optical disk, a magneto-optical disk, a CD-ROM, a magnetic tape, a non-volatile memory card, and a ROM.

In the case where the functions of any embodiment described above are realized by executing the program code on the computer which operates under the control of an OS (operating system) or in the case where the functions of any embodiment described above are realized by executing the program code in cooperation with another application software, the program code also falls within the scope of the invention.

The invention also includes within its scope a program code which is first stored in a memory provided on an extended board of a computer or in an extended unit connected to the computer, and all or a part of the process is performed by a CPU located on the extended board or in the extended unit in accordance with the program code.

As many apparently widely different embodiments of the present invention can be made without departing from the sprit and cope thereof, it is to be understood that the invention is not limited to the specific embodiments thereof except as defined in the appended claim.

What is claimed is:

1. An image processing method comprising the steps of:
   outputting, using an image forming unit, a chart including a plurality of patches used to determine a correction parameter; inputting a command issued by a user to specify a particular patch in said chart; and producing said correction parameter in accordance with said command issued by the user,
   said image processing method being characterized in that each of said plurality of patches includes an image reproduced using process black and an image reproduced using a black recording agent.

2. An image processing method according to claim 1, wherein said plurality of patches are arranged so that the color difference between the image formed using the black ink and the image formed using the process black can be compared.

3. An image processing method according to claim 1, wherein said chart is formed by arranging a plurality of patches in which the intensity level of yellow ink is fixed, and the intensity levels of magenta and cyan inks are varied path by path.

4. An image processing method according to claim 1, wherein said chart outputting step outputs a plurality of charts depending on the types of recording agents used by said image forming unit.

5. An image processing method according to claim 1, wherein said chart includes two types of charts one of which includes a plurality of patches arranged therein in which the intensity level of yellow ink is fixed and the intensity levels of high-density magenta ink and high-density cyan ink are varied, and the other one of which includes a plurality of patches arranged therein in which the intensity level of yellow ink is fixed and the intensity levels of low-density magenta ink and low-density cyan ink are varied.

6. An image processing method according to claim 1, wherein said chart includes a plurality of patches arranged therein in which the intensity level of magenta ink is fixed, and the intensity levels of yellow ink and cyan ink are varied.

7. An image processing method according to claim 1, wherein said chart includes a plurality of patches arranged therein in which the intensity level of cyan ink is fixed, and the intensity levels of yellow ink and magenta ink are varied.

8. An image processing method according to claim 1, wherein each of said plurality of patches includes a circular-shaped pattern embedded in a rectangular-shaped pattern.

9. An image processing method according to claim 1, wherein each of said plurality of patches includes a pattern having an outward extending part and an inward recessed part embedded in a rectangular-shaped pattern.

10. An image processing method according to claim 1, wherein said correction parameter is represented in the form of a table in which no more than two input values correspond to the maximum output value.

11. An image processing method according to claim 1, wherein said correction parameter is linear.

12. An image processing method according to claim 1, wherein said correction parameter is non-linear.

13. An image processing method according to claim 1, wherein in said chart, the patch intensity level varies linearly.

14. An image processing method according to claim 1, wherein in said chart, the patch intensity level varies non-linearly.

15. An image processing apparatus comprising:

chart outputting means for outputting, via an image forming unit, a chart including a plurality of patches used to determine a correction parameter;

inputting means used by a user to input a command specifying a particular patch of said chart; and generation means for generating said correction parameter in accordance with said command input by the user, said image processing apparatus being characterized in that each of said plurality of patches includes an image reproduced using process black and an image reproduced using a black recording agent.

16. A storage medium on which a computer readable program is stored, said program comprising the steps of:

outputting, using an image forming unit, a chart including a plurality of patches used to determine a correction parameter;

inputting a command issued by a user to specify a particular patch in said chart; and producing said correction parameter in accordance with said command issued by the user, wherein each of said plurality of patches includes an image reproduced using process black and an image reproduced using a black recording agent.

* * * * *

UNITED STATES PATENT AND TRADEMARK OFFICE
CERTIFICATE OF CORRECTION

PATENT NO.    : 6,331,042 B1
DATED         : December 18, 2001
INVENTOR(S)   : Shigeki Yamada Page 1 of 1

It is certified that error appears in the above-identified patent and that said Letters Patent is hereby corrected as shown below:

<u>Title page,</u>
Item [56] References Cited, U.S. PATENT DOCUMENTS, "5,797,690  11/1998 Iwamura et al." should read -- 5,797,690  8/1998  Iwamura et al. --.

<u>Column 3,</u>
Line 42, "E" should be deleted.

<u>Column 7,</u>
Line 38, "ink," should read -- ink. --.

<u>Column 10,</u>
Line 6, "sprit and cope" should read -- spirit and scope --;
Line 13, "parameter; inputting" should read -- parameter;
                                                                        inputting --; and
Line 14, "and producing" should read -- and
                                                      producing --.

Signed and Sealed this

Twenty-eighth Day of May, 2002

Attest:

JAMES E. ROGAN
*Attesting Officer* — *Director of the United States Patent and Trademark Office*